May 21, 1946.    H. E. MALONE    2,400,560
FLOAT VALVE
Filed April 26, 1943
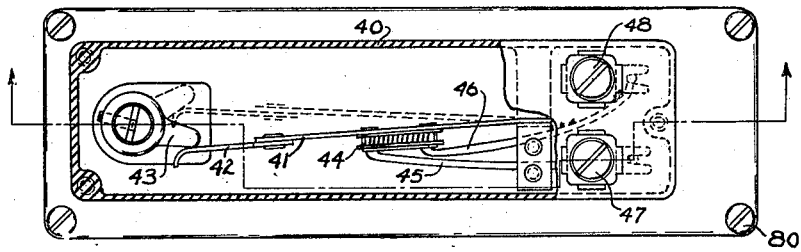
Fig. 3
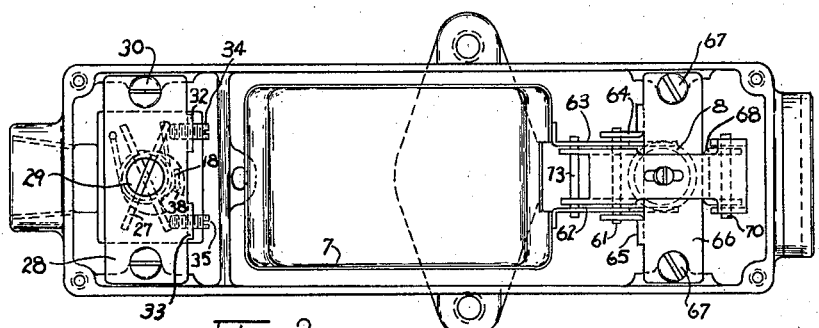
Fig. 2
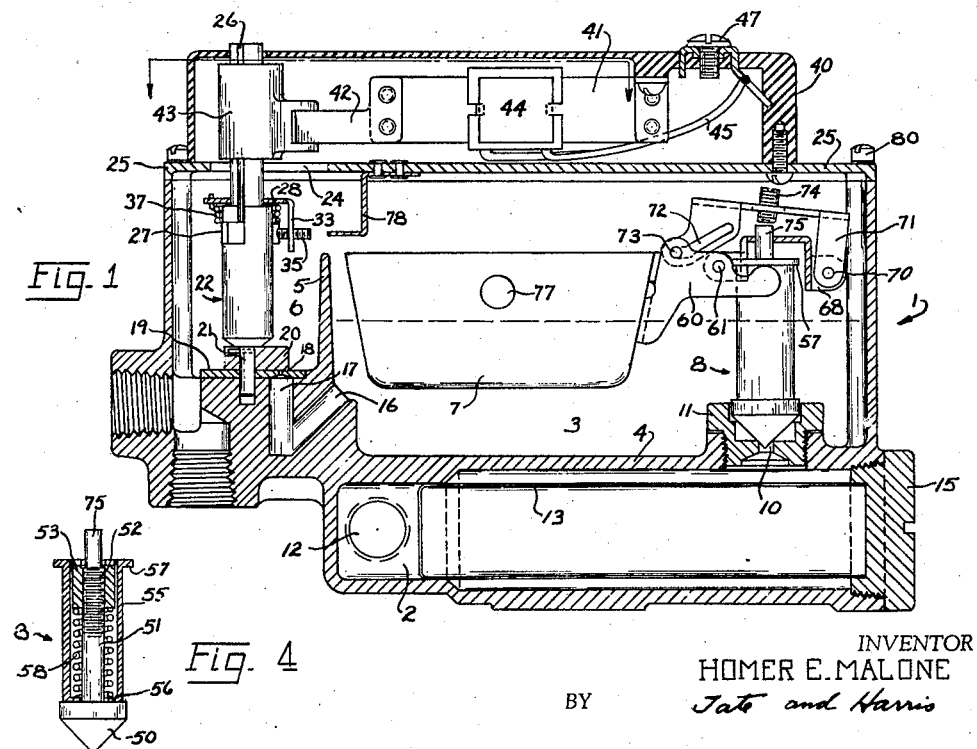
Fig. 1
Fig. 4
INVENTOR
HOMER E. MALONE
BY  Tate and Harris
ATTORNEYS Patented May 21, 1946

2,400,560

UNITED STATES PATENT OFFICE 2,400,560

FLOAT VALVE

Homer E. Malone, Milwaukee, Wis., assignor to Perfex Corporation, Milwaukee, Wis., a corporation of Wisconsin Application April 26, 1943, Serial No. 484,535

9 Claims. (Cl. 137—68)

This invention relates generally to liquid level controls, and more particularly to controls for supplying liquid fuel to vaporization type oil burners. In this type of apparatus a float is employed for controlling an inlet valve to a float chamber so as to maintain a constant level, this maintaining a constant head on a metering valve which meters the flow of oil to the burner. In order to meet existing safety requirements in the trade, it is necessary that provision be made for positively closing the inlet valve in case it should leak and permit the oil level in the float chamber to rise a predetermined amount above the normal constant level. It is also necessary to provide against float failure. That is, to cause closure of the inlet valve in case the float should leak and sink. In the past, the incorporating of the above safety features has required either additional expensive and delicate shut-off mechanism or resort to a double-seated inlet valve which involves considerable difficulties in manufacture.

The primary object of this invention is to provide a simple and dependable float valve embodying the required safety features.

This result is obtained by use of a single open float and by a single biased closed inlet valve. The float acts during normal operation to open the valve against its bias when the oil level lowers and thus maintains a substantially constant level. If the inlet valve fails to hold, the liquid level rises above the normal level and overflows into the float, causing it to sink. This sinking motion and the weight of the float is utilized through a motion reversing mechanism to force the inlet valve closed. This arrangement requires a strain release mechanism between the float and valve member.

A further object of the invention is the provision of a simple and compact strain release mechanism which permits a valve member to be actuated by two separate actuators.

A further object of the invention is the provision of an arrangement by which the float when sunk in the oil may be emptied without removal of any parts of the float valve mechanism.

Other objects will appear from the following description and the appended claims.

For a full disclosure of the invention, reference is made to the following detailed description and to the accompanying drawing, in which Fig. 1 shows an elevation, partly in section, of a complete float valve embodying the invention;

Fig. 2 is a top view of the device shown in Fig. 1 with the cover removed;

Fig. 3 is a top view, partly in section, showing the thermostatic actuator for the metering valve; and Fig. 4 is a sectional view of the inlet valve shown in Fig. 1.

Referring to Fig. 1, reference character 1 indicates generally a float valve casing. This casing is divided into a strainer chamber 2 and a constant level or float chamber 3 by a horizontal partition 4. A dam 5 separates the float chamber 3 from an outlet chamber 6. A float 7 is located in the float chamber and serves to position an inlet valve 8 which controls the flow of oil through a valve port 10 which is formed in a fitting 11 screwed into the partition 4. Oil flows into the filter chamber 2 through an inlet 12 and passes through a filter 13 and valve port 10 into the float chamber 3. It will be noted that the filter chamber 2 is provided with an open end which is closed by a plug 15 which cooperates in maintaining the filter in place.

The oil passes from the float chamber 3 through intersecting bores 16 and 17 in the casing to a metering valve port 18 which is formed in a flat plate 19 secured in a fluid-tight manner to the casing. The metering valve port 18 is covered by a rotary metering valve member 20 which is secured to the reduced portion 21 of a rotary metering valve shaft 22 which extends upwardly through the outlet chamber 6. The reduced portion 21 extends through an opening in the plate 19 and the valve casing, this serving to hold the lower end of the shaft 22 in place. The upper end of the shaft 22 extends through an opening 24 formed in the cover plate 25 of the valve casing. This upper portion is split to provide a slot 26. This slot at its lower end receives a stop member 27 which extends outwardly from each side of the shaft, as shown in Fig. 2. A cross member 28 extends from side to side of the valve casing and is provided with a circular opening 29 (Fig. 2) and serves as a guide for the upper portion of the valve shaft. This cross member is secured to the sides of the casing by screws 30 which are received in bosses formed on the casing side walls. The cross member 28 is provided with downwardly extending projections 32 and 33 which receive stop screws 34 and 35 which cooperate with the stop member 27 in limiting rotary movement of the valve shaft. The cross piece 28 also receives one end of a spiral spring 37 which surrounds the valve shaft, having its other end secured to the shaft for biasing the shaft in a clockwise direction as seen in Fig. 2, thus normally maintaining the stop member 27 in engagement with the stop screw 32. As shown in Fig. 2, the rotary valve member 20 is provided with a cut-out portion 38. As the valve member is rotated in a counter-clockwise direction, this cut-out portion is brought into registration with the valve port 18. It will be apparent, therefore, that the stop screw 32 determines the amount that the valve port 18 may be covered by the valve member, and that the stop screw 35 determines the amount that the valve port may be uncovered by the valve member. The stop screw 34 therefore serves as a low flame or pilot adjustment, while the stop screw 35 serves as a high fire adjustment for the burner.

Secured to the cover 25 is a housing 40 formed of insulating material. This housing supports a bimetallic element 41 which is mounted in a vertical plane and which extends generally horizontally across the top of the casing. The free end of this element is secured to an actuator 42 which abuts a crank arm 43 which is secured to the valve actuating shaft 22. This element is provided with an electric heater 44 having leads 45 and 46 which are attached to terminals 47 and 48 carried by the housing 40. When the electric heater 44 is deenergized the thermostatic element 41 assumes the position shown in full lines in Fig. 3. At this time the stop member 27 assumes the position shown in full lines in Fig. 2 in which it abuts the stop screw 32 and thus the opening of the metering valve is at a minimum for providing low or pilot flame. When the electric heater 44 is energized, the bimetallic element 41 warps to the position shown in dotted lines in Fig. 3, thus rotating the metering valve shaft counter-clockwise until the stop member 27 engages the stop screw 35 as shown in dotted lines in Fig. 2. This opens the metering valve to an extent determined by the stop screw 35 and thus provides a relatively high oil flow for causing the burner to operate at high flame.

The metering valve construction and control arrangement above described form the subject matter of the application of Homer E. Malone and Clarence H. Traver, Serial No. 484,536, filed April 26, 1943.

Referring now to the float valve construction, the interior of the inlet valve is shown in Fig. 4. This inlet valve consists of a valve member having an enlarged head portion 50 and an elongated stem portion 51 of a diameter smaller than the head portion. This stem portion 51 is threaded near its upper end at 52 and receives a guiding nut 53. Surrounding the stem portion 51 and spaced therefrom is a sleeve member 55. This sleeve member is provided with an in-turned guide portion 56 at its lower end which extends inwardly into contact with the stem portion 51. The sleeve 55 is also provided with a flange 57 at its upper end for actuation by the float. A spring 58 is interposed between the stem portion 51 and the sleeve member 55. The upper end of the spring abuts the nut 53 and the lower end of the spring abuts the guide portion 56 of the sleeve. This serves to urge the valve member 50 upwardly into engagement with the lower end of the sleeve member which acts as a stop. Thus under ordinary conditions the sleeve member 55 and the valve member 50 move as a unit. The purpose of this arrangement will become apparent as this description proceeds.

The float 7 is attached to a float lever 60 which is pivoted to a pivot pin 61. As shown in Fig. 2, the float lever 60 consists of separate spaced apart members 62 and 63, these members extending on opposite sides of the inlet valve 8 and engaging the under-surface of the flange 57. The pivot pin 61 is carried by bracket members 64 and 65 which are formed on a cross piece 66 which extends from side to side of the casing and which is secured in place by screws 67 which fit into bosses formed in the casing side walls.

The cross member 66 is also formed to provide a bracket 68 which receives a pivot pin 70. This pivot pin carries a safety cut-off lever 71 which overlies the valve member and which is provided with a slot 72 receiving a pivot pin 73 carried by members 62 and 63 of the float lever 60. The cut-off lever 71 is provided with an adjustable screw 74 which is arranged for engagement with an extension 75 of the inlet valve stem 51. This screw 74 is adjusted so that a slight space is present between it and the extension 75 when the float is in the position corresponding to normal oil level.

In operation, the parts normally assume the positions shown in Fig. 1. The weight of the inlet valve assembly is sufficient to close the valve port 10 and prevent entry of oil into the float chamber, this weight serving to bias the valve closed. When the oil level drops slightly from the desired or predetermined level the float lowers, this rocking the float lever 60 counter-clockwise about its pivot 61 thereby raising the inlet valve assembly 8 from its seat and permitting oil to flow into the float chamber. As the oil level rises, the float rises accordingly, thus permitting the valve assembly to approach its valve seat for reducing the flow of oil. In this manner the float 7 serves to maintain a substantially constant oil level in the float chamber.

In the event that the valve member should fail to seat properly, due for example to dirt on the valve seat, the oil level in the float chamber will eventually rise. The float will then engage a stop 78 attached to the cover 25. Further rise in oil level will now result in the oil flowing through an opening 77 in the float. This causes the float to sink.

The initial sinking movement of the float will raise the inlet valve assembly to wide open position, thereby providing a maximum flow of oil for flushing off the valve member and seat. As the float sinks the pin 73 on the float lever 60 is carried downwardly, thereby causing rotation of the safety cut-off lever 71 counter-clockwise, this bringing the screw 74 into engagement with the extension 75 and forcing the valve stem 51 and valve member 50 downwardly for shutting off the flow of oil. At this time the valve lever 60 is raising the sleeve 55 upwardly. This relative movement between the valve member and sleeve is permitted by yielding of the spring 58. During this relative movement, the parts are held in alignment by the inturned guide portion 56 of the sleeve 55 and by nut 53.

It will be noted that when the float sinks, the actuator or safety cut-off lever 71 provides for a greatly increased mechanical advantage between the float and valve member than is provided by the valve lever 60 during normal operation. In addition, the entire weight or displacement of the float is applied to the valve member instead of simply a slight displacement as occurs during normal operation. As a result the float when sunk and acting through the safety cut-off means applies a much greater closing force to the valve than is provided simply by the weight of the valve member. This insures that the valve will close tightly for completely cutting off the flow of oil into the float chamber.

In order to re-set the valve for normal operation, the cover 25 is removed by removing screws 80. The float is then raised and rotated about pivot 61 until the oil runs out of the float back into the float chamber. During this movement the pin and slot connection 72—73 between the float lever 60 and cut-off lever 71 of the lever means provides for the necessary relative movement between these levers. After the float is emptied it is allowed to drop back in place and the cover 25 is replaced. The valve is then ready for further operation.

It should be noted that by removal of screws 67 the cross member 66 may be removed. This cross member carries the float, float arm, and safety cut-off lever. Thus this assembly may be removed as a unit, thereby providing for easy access to the valve member for cleaning or regrinding the valve surfaces.

It should also be noted that the metering valve port 18 is located well above the bottom of the float chamber 3. This serves to retain sufficient oil in the float chamber to keep the float floating above the point at which it closes the valve through the safety cut-off lever. Thus if the oil supply becomes exhausted the float chamber will not empty and cause closure of the inlet valve through the safety cut-off lever.

From the foregoing description it will be apparent that the present invention provides an extremely simple arrangement for insuring safety cut-off in case the inlet valve should leak. It will also be apparent that this invention provides a novel strain release valve member assembly which permits actuation of the valve member by separate actuators. It will also be seen that the invention provides a simple arrangement which permits the entire inlet valve assembly to be easily removed for cleaning or repairing. While a preferred form of the invention has been shown and described, many modifications within the scope of the invention will be apparent to those skilled in the art. It is therefore desired to be limited only by the scope of the appended claims.

What is claimed is:

1. In a safety constant level control mechanism, a casing providing a float chamber and an inlet port therefor, a valve member associated with said port, said valve member having a head portion and an elongated stem portion of reduced diameter as compared to the head portion, a sleeve member having an internal diameter greater than said stem portion and fitted over said stem portion, guide means on one end of the sleeve member, said guide means extending inwardly for engaging the stem portion, guide means on the stem portion extending outwardly for engaging the sleeve member, a coil spring interposed between the stem portion and sleeve member, said coil spring yieldably forcing said guide means apart for holding said sleeve member and said head portion in engagement, an open float in said chamber, lever means actuated by said float and arranged to engage said sleeve portion for raising the valve member from its seat as the liquid falls below a predetermined level, means for causing said float to fill and sink if the liquid rises a predetermined amount above said predetermined level, and motion reversing means associated with said lever means for transmitting sinking movement of the float directly to said valve stem portion for forcing the valve closed.

2. A strain release valve comprising a stationary valve seat, a valve member cooperating with said seat, said valve member having a head portion and an elongated stem portion of reduced diameter as compared to the head portion, a sleeve member having an internal diameter greater than said stem portion and fitted over said stem portion, guide means on the end of the sleeve member adjacent the head portion, said guide means extending inwardly for engaging the stem portion, guide means on the stem portion extending outwardly for engaging the sleeve member, a coil spring interposed between the stem portion and sleeve member, said coil spring yieldably forcing said guide means apart for holding said sleeve member and said head portion in engagement, an actuator engaging the sleeve member for shifting the valve member relative to said seat, and means adapted to engage the stem portion for holding the valve against its seat irrespective of said actuator.

3. A strain release valve comprising, a stationary valve seat, a valve member cooperating with said seat and having an elongated stem portion, a sleeve member surrounding the stem portion and spaced therefrom, guide means on the sleeve member extending inwardly for engaging the stem portion, a coil spring interposed between the stem portion and sleeve member, guide means on the stem portion extending outwardly for engaging the sleeve, said spring having one end bearing against one of said guide means and its other end bearing against the other of said guide means, stop means between the sleeve member and stem portion for maintaining stress on said spring and normally holding said stem portion and sleeve member in predetermined relationship, an actuator engaging the sleeve member for shifting the valve member relative to said seat, and means adapted to engage the stem portion for holding the valve against its seat irrespective of said actuator.

4. In a control device, the combination of, a stationary valve seat, a valve member associated with said seat, said valve member having a valve stem, a sleeve surrounding said valve stem, means including a spring interposed between said sleeve and valve stem for holding said sleeve and valve stem in fixed but yieldable relationship, first actuating means for actuating said sleeve and second actuating means for actuating said valve stem.

5. In a safety constant level control mechanism, a casing providing a float chamber and an inlet port therefor, a valve member associated with said port, said valve member having a valve stem, an open float in said chamber, first actuating means including lever means actuated by said float and arranged to cause gradual movement of the valve member from its seat as the liquid falls below a predetermined level, means for causing the float to fill and sink if the liquid rises a predetermined amount above said predetermined level, second actuating means including motion reversing means associated with said lever means for causing sinking movement of the float to cause closing movement of the valve member, and a spring surrounding said valve stem for transmitting the motion of said first actuating means to said valve member, said spring yielding to permit the second actuating means to hold the valve member against its seat.

6. In a safety constant level control mechanism, a casing providing a float chamber and an inlet port therefor, a valve member associated with said port, said valve member having a valve stem, a sleeve surrounding said valve stem, means including a spring interposed between the sleeve and valve stem for holding the sleeve and valve stem in fixed but yieldable relationship, a float, means actuated by said float for normally actuating said sleeve to thereby position the valve member for maintaining a predetermined liquid level, and safety means adapted to engage the valve stem for forcing the valve member to closed position.

7. In a safety constant level control mechanism, a casing providing a float chamber and an inlet port therefor, a valve member associated with said port, said valve member having a valve stem element, a sleeve element surrounding the valve stem element, a spring interposed between said elements for holding them in fixed but yieldable relationship, a float, means actuated by said float and engaging one of said elements for operating the valve member to maintain a substantially constant liquid level, and safety means adapted to engage the other of said elements for forcing the valve member to closed position.

8. In a safety constant level control mechanism, a casing providing a float chamber and an inlet port therefor, a valve member associated with said port, said valve member having a valve stem, a sleeve surrounding said valve stem, means including a spring interposed between the sleeve and valve stem for holding the sleeve and valve stem in fixed but yieldable relationship, an open float in said chamber, a float lever carrying said float and engaging said sleeve for actuating said valve member through the spring to maintain a predetermined liquid level, a safety cut-off lever adjacent the valve stem, means for causing said float to fill and sink when the liquid level rises a predetermined amount above said predetermined level, and a pin and slot connection between the float lever and safety cut-off lever arranged to transmit sinking movement of the float to the safety cut-off lever in a direction to force the valve member against its seat, said pin and slot connection permitting rotation of the float lever for dumping the float without interference by said safety cut-off lever.

9. In a safety constant level control mechanism, a casing providing a float chamber and an inlet port therefor, a valve member associated with said port, said valve member having a valve stem, an open float in said chamber, a float lever carrying said float and engaging the valve stem for actuating the same to maintain a predetermined liquid level, a safety cut-off lever arranged to engage the valve stem, means for causing said float to fill and sink when the liquid level rises a predetermined amount above said predetermined level, and a pin and slot connection between the float lever and safety cut-off lever arranged to transmit sinking movement of the float to the safety cut-off lever in a direction to force the valve member against its seat, said pin and slot connection permitting rotation of the float for dumping the same without interference by said safety cut-off lever.

HOMER E. MALONE.